United States Patent
Meyerson et al.

(10) Patent No.: US 7,177,403 B2
(45) Date of Patent: Feb. 13, 2007

(54) EVENT DRIVEN MULTI-MEDIA COMMUNICATION MANAGEMENT SYSTEM

(76) Inventors: Robert F. Meyerson, 2180 Immokalee Rd., Suite 311, Naples, FL (US) 34110; Christopher L. Adams, 6130 Mountainwell Dr., Roswell, GA (US) 30075; Robert M. Nebiker, 5948 Sand Wedge La., #903, Naples, FL (US) 34110

( * ) Notice: Subject to any disclaimer, the term of this patent is extended or adjusted under 35 U.S.C. 154(b) by 404 days.

(21) Appl. No.: 10/008,281

(22) Filed: Feb. 19, 2002

(65) Prior Publication Data

US 2003/0059001 A1 Mar. 27, 2003

Related U.S. Application Data

(63) Continuation-in-part of application No. 10/002,542, filed on Oct. 23, 2001, and a continuation-in-part of application No. 09/961,532, filed on Sep. 24, 2001.

(51) Int. Cl.
 *H04M 1/64* (2006.01)
(52) U.S. Cl. ............... 379/88.13; 379/88.12; 379/130; 379/221.01; 370/352; 455/462
(58) Field of Classification Search ............... 379/67.1, 379/76, 88.17, 88.18, 70, 72, 88.03, 88.12, 379/88.13, 221.01, 130; 709/206, 230, 203, 709/246, 228, 204, 205; 370/352; 455/462, 455/550.1
See application file for complete search history.

(56) References Cited

U.S. PATENT DOCUMENTS

| | | | |
|---|---|---|---|
| 4,817,127 A | 3/1989 | Chamberlin et al. | |
| 5,483,586 A | 1/1996 | Sussman | |
| 5,550,907 A | * 8/1996 | Carlsen | 379/211.02 |
| 5,633,920 A | * 5/1997 | Kikinis et al. | 379/130 |
| 5,655,015 A | 8/1997 | Walsh et al. | |
| D389,146 S | 1/1998 | Tan | |
| 5,742,905 A | 4/1998 | Pepe et al. | |
| 5,799,068 A | 8/1998 | Kikinis et al. | |
| 5,870,549 A | 2/1999 | Bobo, II | |
| 5,916,302 A | 6/1999 | Dunn et al. | |
| 5,917,543 A | 6/1999 | Uehara | |
| 5,983,073 A | 11/1999 | Ditzik | |
| 6,188,677 B1 | 2/2001 | Oyama et al. | |
| 6,240,168 B1 | 5/2001 | Stanford et al. | |

(Continued)

OTHER PUBLICATIONS

Symbol Technologies, Press Release, Symbol Announces Wireless LAN Telephone System, Jan. 19, 1998.

*Primary Examiner*—Fan Tsang
*Assistant Examiner*—M S A Elahee
(74) *Attorney, Agent, or Firm*—Timothy P O Hagan

(57) ABSTRACT

The event driven multi-media communication management system comprises a controller that interfaces with a plurality of communication space stations and with one or more communication medium service providers. The communication space station is a modular device that includes a platform, a voice system for providing an audio user interface, and a docking bay for coupling with a subscriber device. The controller accesses a subscriber contact directory that is associated with the subscriber device, communicates content messages representing at least a portion of the subscriber contact directory to the subscriber station, receives control messages representing subscriber selection of a contact, and establishes a communication channel in accordance with the selected subscriber communication information.

11 Claims, 16 Drawing Sheets

U.S. PATENT DOCUMENTS

| | | |
|---|---|---|
| 6,253,088 B1 * | 6/2001 | Wenk et al. ................ 455/462 |
| 6,330,244 B1 | 12/2001 | Swartz et al. |
| 6,330,321 B2 | 12/2001 | Detampel, Jr. et al. |
| 6,366,653 B1 | 4/2002 | Yeh et al. |
| 6,366,771 B1 | 4/2002 | Angle et al. |
| 6,389,005 B1 | 5/2002 | Cruickshank |
| 6,396,907 B1 | 5/2002 | Didcock |
| 6,404,772 B1 | 6/2002 | Beach et al. |
| 6,424,711 B1 | 7/2002 | Bayless et al. |
| 6,429,855 B2 | 8/2002 | Pabon et al. |
| 6,539,499 B1 | 3/2003 | Stedman et al. |
| 6,570,976 B2 * | 5/2003 | Asada et al. ........... 379/221.01 |
| 6,577,609 B2 | 6/2003 | Sharony |
| 6,600,734 B1 | 7/2003 | Gernert et al. |
| 6,704,580 B1 * | 3/2004 | Fintel ..................... 455/550.1 |
| 6,757,833 B2 * | 6/2004 | Wakai et al. ............... 713/200 |
| 6,792,295 B1 | 9/2004 | Hanevich et al. |
| 6,839,735 B2 * | 1/2005 | Wong et al. ................ 709/204 |
| 2002/0035605 A1 * | 3/2002 | McDowell et al. |
| 2002/0085535 A1 | 7/2002 | Williams |
| 2002/0086702 A1 | 7/2002 | Dimenstein et al. |
| 2003/0023691 A1 * | 1/2003 | Knauerhase |

* cited by examiner

| Start Up State - Waiting for Events ||
|---|---|
| Events | Steps |
| Open Session Request on Predetermined Port | · Establish New Local Communication Device State Machine<br>· Establish Session<br>· Send Logon Control Scripts<br>· Get CSS Interface Configuration<br>· Provide Main Menu Display Content<br>· Provide Main Menu Layout Control<br>· Go to Main Menu State |

Figure 10a

| Main Menu State - Waiting for Events ||
|---|---|
| Events | Steps |
| Menu Selection | · Go To Selected State |
| Initialize Subscriber Device | · Send ID Extraction Control Scripts<br>· Get Subscriber Device ID<br>· Update Network Location Table<br>· Synchronize Subscriber Contact Directory<br>· Provide Initial Display Content (Main Menu)<br>· Provide Display Layout Control<br>· Go To Subscriber Device Main Menu State |
| Help Request | · Set Up Audio Session Channel<br>· To Audio Help CCS<br>· Go To Audio Help State |

| Subscriber Device Main Menu State - Waiting for Events ||
|---|---|
| Events | Steps |
| Menu Selection | · Go To Selected State |
| Help Request | · Provide Help Menu Display Content<br>· Provide Help Menu Display Layout Control<br>· Go To Graphic Help State |
| Message Request | · Get Messages from Remote System<br>· Sort Messages by Type<br>· Provide Message List Content<br>· Provide Message List Layout Control<br>· Go To Message List State |
| Audio Message Request | |
| Directory Request | · Provide Directory Content and Layout Control<br>· Transition to Subscriber Directory State |
| Subscriber Device Remove | · Go To Main Menu State |

312 — Menu Selection
320 — Help Request
322 — Message Request
324 — Audio Message Request
314 — Directory Request
326 — Subscriber Device Remove

| Message List State - Waiting for Events | |
|---|---|
| Events | Steps |
| 334 — Audio Message Select | · Send Audio File to CSS<br>· Provide Processing Script to Output File<br>· Go To Audio Session State |
| 336 — Message Select | · Provide Message Display Content<br>· Provide Message Display Layout Control<br>· Go To Message Display State |
| 338 — Message Print | · Format Message Content for Printer<br>· Send Message File to Printer<br>· Go To Message List State |
| 340 — Help Request | · Provide Help Menu Display Content and Display Layout Control<br>· Go To Graphic Help State |
| 342 — Subscriber Device Remove | · Go To Main Menu State |

| Subscriber Directory State - Waiting for Events | |
|---|---|
| Events | Steps |
| 372 — Receive Contact Selection | · Provide Control Script to Setup Audio Session with Contact<br>· Provide Audio Session Display Content and Layout Control<br>· Transition to Audio Session State |
| 374 — Help Request | · Provide Help Menu Display Content and Display Layout Control<br>· Go To Graphic Help State |
| 378 — Subscriber Device Remove | · Go To Main Menu State |

Figure 10e

| 344 |
|---|

| Base State - Waiting for Events ||
|---|---|
| Events | Steps |
| 354 — Touch Panel | · Report Touch Panel Event to Controller<br>· Return to Base State |
| 356 — Subscriber Interface Control Button | · Report Button Activation to Controller and PVA<br>· Return to Base State |
| 358 — Receive Display Content and Layout Control Messages | · Update Display<br>· Return to Base State |
| 360 — Receive Processing Script | · Process Script<br>· Return to Base State |
| 362 — WAN Telephone Signal | · Go To WAN State |
| 364 — Detect Subscriber Device | · Send Initialize Subscriber Message<br>· Return to Base State |
| 350 — Receive Messages from Controller Directed to Subscriber Device | · Relay Messages to Subscriber Device |
| 352 — Receive Messages from Subscriber Device Directed to Controllers | · Relay Messages to Controller |

| 346 — Start Up - Waiting for Events ||
|---|---|
| Events | Steps |
| 366 — Network Connection | · Session Request to Control Unit |
| 368 — Receive Logon Script | · Process Logon Script<br>· Provide Interface Configuration<br>· Go To Base State |

Figure 11

| 380 | |
|---|---|
| Standby State - Waiting for Events | |
| Events | Steps |
| Audio Session Signal from Packet Voice Gateway | · Transition to Call Signalling State<br>· Report State Transition to CSS Application |
| Subscriber Interface Control (Off Hook) | · Transition to Off Hook State<br>· Report State Transition to CSS Application |
| Session Setup Event from CSS Application | · Send Call Signalling Message to Gateway<br>· Transition to Call Signalling State<br>· Report Transition to CSS |

388 — Audio Session Signal from Packet Voice Gateway
390 — Subscriber Interface Control (Off Hook)
392 — Session Setup Event from CSS Application

| 382 | |
|---|---|
| Call Signaling State - Waiting for Events | |
| Events | Steps |
| On Hook Event | · Return to Standby State<br>· Report State Transition to CSS Application |
| Termination of Signalling | · Return to Standby State<br>· Report State Transition to CSS Application |
| Ready for Audio Session | · Transition to Audio Session State<br>· Report State Transition to CSS Application |

394 — On Hook Event
396 — Termination of Signalling
398 — Ready for Audio Session

| Off Hook State - Waiting for Events | |
|---|---|
| Events | Steps |
| Subscriber Interface Control (Key Pad Activation) from CSS Application | · Generate DTMF Tone |
| Validation of Number Sequence | · Send Call Signalling Messages to Gateway<br>· Transition to Call Signalling State<br>· Report Transition to CSS Application |
| Subscriber Interface Control (On Hook) | · Return to Standby State |

400 — Subscriber Interface Control (Key Pad Activation) from CSS Application
402 — Validation of Number Sequence
404 — Subscriber Interface Control (On Hook)

386

| Audio Session State - Waiting for Events | |
|---|---|
| Events | Steps |
| Termination of Audio Session | · Return to Off Hook State |
| Subscriber Interface Control (Keypad Activation) | · Generate DTMF Tone |
| Subscriber Interface Control (On Hook) from CSS Application | · Return to Standby State |

406 — Termination of Audio Session
408 — Subscriber Interface Control (Keypad Activation)
410 — Subscriber Interface Control (On Hook) from CSS Application

Figure 12b

EVENT DRIVEN MULTI-MEDIA COMMUNICATION MANAGEMENT SYSTEM

CROSS REFERENCE TO RELATED APPLICATIONS

The present application is a continuation in part of U.S. patent application Ser. No. 09/961,532 titled Teledata Space and Docking Station with Modular and Integrated Display filed on Sep. 24, 2001, and is a continuation in part of U.S. patent application Ser. No. 10/002,542 filed on Oct. 23, 2001, titled Modular Multi-Media Communication Management System, the contents of both such patent applications is incorporated herein.

TECHNICAL FIELD

The present invention relates generally to managing multi-media communications, and more particularly to a modular system for integrating and coordinating a subscriber's communication needs.

BACKGROUND OF THE INVENTION

In today's fast paced business world, it is common for a person to rely on a combination of communication devices, such as: desk top telephones, mobile telephones, cellular telephones, fax machines, pagers, and the like, as well as enhanced communication services, such as: voice mail, e-mail, text messaging and the like to accommodate their communication needs.

In an office environment, desk top telephone service, voice mail service, and fax service is typically provided by a private telephone communication system. A contemporary private telephone communication system consists of a switching network, a plurality of desk-top telephones, and a voice mail server. The voice mail server is typically coupled to the switching network using a proprietary interface. Each desk top telephone and fax machine is coupled to the switching network by an extension line that consists of twisted pair conductors that are terminated by a telephone jack in the office. Communication between the desk-top telephone and the switching network over each extension line utilizes either proprietary digital signaling or plain old telephone service (POTS) signaling. The switching network is further coupled to the public switched telephone network (PSTN) using trunk lines that are connected to a central office switch that is typically managed by the local telephone service provider. The switching network controls calls between extensions and between an extension and a remote destination via a trunk line coupled to the PSTN. The switching network also routes calls to the voice mail server when an extension remains unanswered, is busy, or is otherwise programmed to route calls to voice mail.

Recently fixed wireless networks have enabled wireless mobile telephones to be supported by the private telephone communication system. A wireless telephone controller is coupled to a wireless network in which a plurality of mobile telephones may be operated. The wireless telephone controller is coupled to the switching network of the private telephone communication system. In operation, each mobile telephone is assigned an extension number and calls directed to that extension are routed to the wireless telephone controller and then to the mobile telephone over the wireless network. Because the mobile telephone is equivalent to a desk-top telephone from the perspective of the private telephone communication system, full voice mail services are supported for the mobile telephone.

E-mail service is typically provided by an e-mail service provider (either a private system or an independent Internet mail service provider). An e-mail client on the person's desk-top and/or notebook computer is typically used for sending and receiving e-mail over a data network connection to the e-mail service provider.

Cellular service is provided by a cellular service provider. A cellular handset is used to place and receive cellular telephone calls within the cellular service provider's network. Additionally, the cellular service provider may offer a voice mail service which prompts callers to leave a voice mail in the event that the cellular handset is busy or remains unanswered after several rings. Similarly, pager services are provided by a paging service provider. A one-way (or two-way) pager may receive (and send) text messages within the paging service provider network.

A problem associated with the above systems is that there is a lack of integration and coordination among the services. This lack of integration and coordination causes a person to carry several devices with them as they do not know which telephone number a caller will choose to use. And, it causes a person to check multiple voice mail systems and e-mail systems frequently to avoid delays in returning calls or e-mails.

Some of these problems can be eliminated, in theory, by vigilant use of call forwarding services to assure that incoming calls are forwarded, or funneled, to a single telephone that the person chooses to use at a particular time. However, call forwarding is unworkable if call forward programming cannot be changed remotely and is still time consuming if programming can be performed remotely.

Other advancements in voice mail server technology have addressed the need to frequently check multiple voice mail systems. For example, some voice mail servers send an audio file of a voice mail message to a specified e-mail address. This enables a person to retrieve voice mail messages through his or her e-mail client rather than dialing into the voice mail server. Additionally, some voice mail servers also initiate a call to a person's pager after a voice mail has been received to notify the person of a voice mail has arrived.

While these advances have helped address the problems, they have not eliminated the need to have all such communication devices and the need to vigilantly check multiple systems for voice mail and/or e-mail messages throughout the day.

What is needed is a multi media communication management system that allows for operator mobility that does not suffer the lack of integration and coordination of existing communication systems.

SUMMARY OF THE INVENTION

The event driven multi-media communication management system comprises a controller that interfaces with a plurality of subscriber stations with their associated subscriber device(s) and with one or more communication medium service providers. The controller accesses subscriber directory information and automatically establishes a communication connection with a selected destination in response to the subscriber activating the associated subscriber device(s) or the subscriber station.

The controller translates multi-media communications received from a multi-media service provider into the protocols required for use by the subscriber stations as well as any conventional telephone stations that may be coupled to the controller. The communication and control signaling between the controller and the subscriber stations may be wireless in nature with the subscriber stations being powered by an internal battery and/or connection to a local source of conventional line voltage.

The architecture of the subscriber station is modular. Multiple functional elements can be interconnected with backbone communication circuitry to form an integrated communication platform. Modular docking interfaces may be used to couple the subscriber station to portable subscriber devices and to enable integrated and coordinated communication through multiple communication medium service providers. This coordinated and integrated system architecture enables the subscriber station to merge the functionality and internal data of the various portable subscriber devices into the subscriber station, to direct the functionality and data of the subsccriber station to a selected one of the portable subscriber devices, and to provide the subscriber with a simple subscriber interface.

The controller further associates multi-media communication directory information with each subscriber device to provide communication channels between a subscriber station and both other subscriber stations and remote destinations across the multi-media communication medium.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 10a shows a table diagram representing an exemplary state of operation of a communication management system in accordance with one embodiment of the present invention;

FIG. 10b shows a table diagram representing an exemplary state of operation of a communication management system in accordance with one embodiment of the present invention;

FIG. 10c shows a table diagram representing an exemplary state of operation of a communication management system in accordance with one embodiment of the present invention;

FIG. 10d shows a table diagram representing an exemplary state of operation of a communication management system in accordance with one embodiment of the present invention;

FIG. 10e shows a table diagram representing an exemplary state of operation of a communication management system in accordance with one embodiment of the present invention;

FIG. 11 shows table diagrams representing exemplary states of operation of a subscriber station accordance with one embodiment of the present invention;

FIG. 12a shows table diagrams representing exemplary states of operation of a subscriber station accordance with one embodiment of the present invention; and FIG. 12b shows table diagrams representing exemplary states of operation of a subscriber station accordance with one embodiment of the present invention.

DESCRIPTION OF THE PREFERRED EMBODIMENTS

Figure 1:
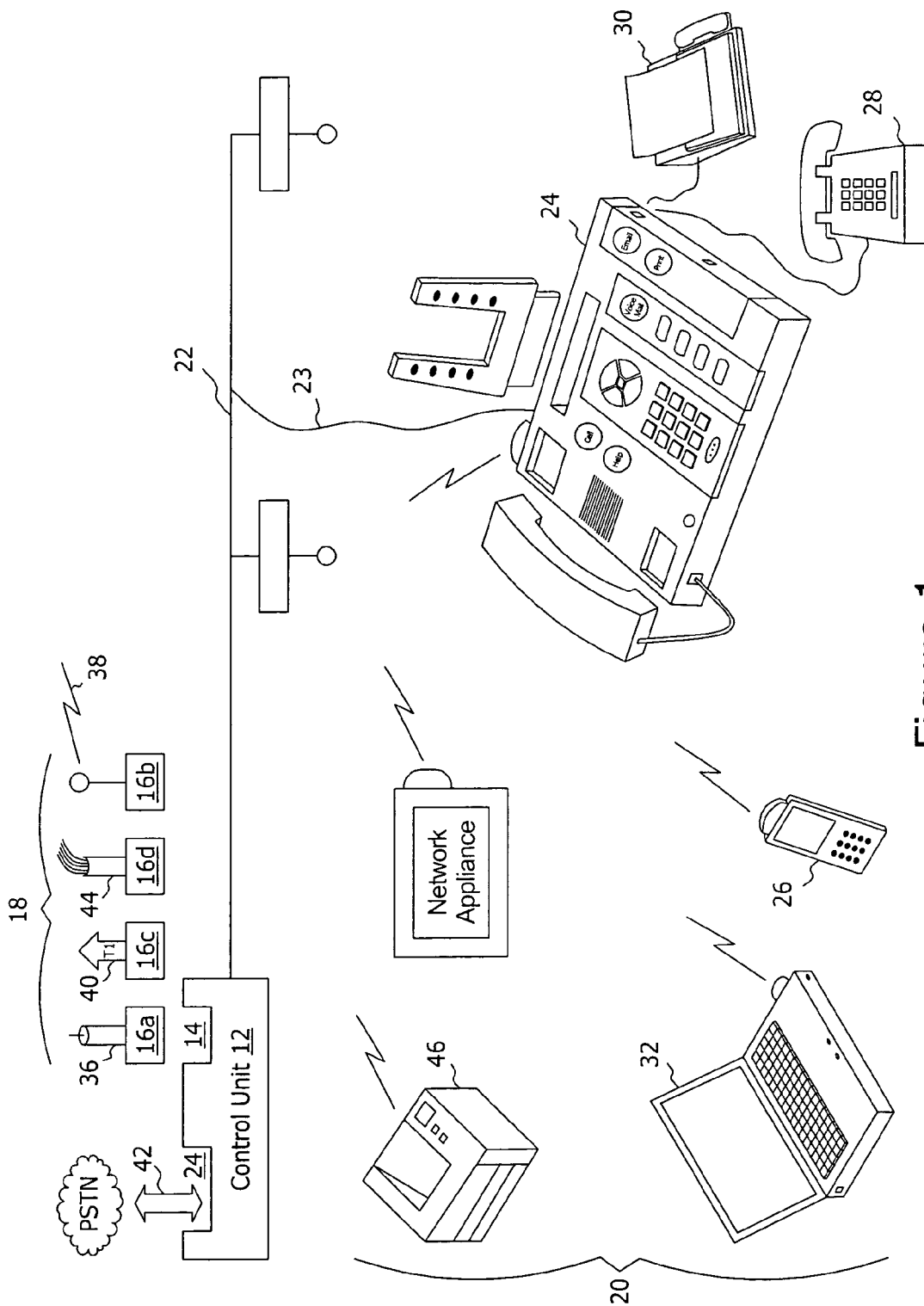
FIG. 1 is a block diagram view of a modular multi-media communication management system in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings. A reference number followed by a "prime" symbol or a "double-prime" symbol represent an element that is a species embodiment of the more generic element designated by the reference number without a "prime" or "double-prime" designation.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Referring to FIG. 1, an exemplary architecture of the multi-media communication management system 10 of the present invention is shown. The multi-media communication management system 10 includes a control unit 12 that is coupled with a plurality of local communication devices 20 over a wireless local area network 22 (or by a wired network connection 23 to the backbone wired network of the wireless local area network 22). The local communication devices 20 may include: subscriber stations 24, wireless dialog handsets 26, traditional telephone handsets 28, traditional fax machines 30 (both coupled through subscriber station 24), traditional computer systems 32, network printers 46, and various network appliances 34.

In operation, the control unit 12 integrates and manages multi-media communication between the local communication devices 20 and between each local communication device 20 and a remote service provider (not shown) over the service provider's multi-media communication medium 18. More specifically, the control unit 12 translates received multi-media communication signals from the multi-media communication medium 18 (or a source local device 20) to the protocols required for use by the destination local communication device 20 (or the multi-media communication medium 18).

The control unit 12 includes a multi-media communication service provider bay 14 which operatively couples one of a plurality of communication medium modules 16a–16d to the control unit 12. Each communication medium module 16a–16d is configured to interface with a service provider's multi-media communication medium 18a–18d. For purposes of illustration, communication module 16(a) may be a cable modem module for communicating over coaxial cable 36 with a multi-media communication service provider such as a local cable company, communication module 16(b) may be a wide area network radio for communication over a wireless spectrum channel 38 with a wide area wireless multi-media communication service provider such as an analog or digital cellular/PCS telephone service provider, communication module 16c may be a customer service unit (CSU) for communication over a T1 line 40 with a multi-media communication provider such as a local telephone service provider, and communication module 16d may be an optical modem for communication over a fiber channel 44 with a fiber optic multi-media communication service provider. It should be appreciated that the examples of communication modules 16a–16d are for illustrative purposes only and it is recognized that multi-media communication services may be provided by other service providers utilizing other communication technologies such as satellite RF or other. For purposes of this invention, a communication module 16 includes circuitry for interfacing between the control unit 12 and a selected multi-media communication service provider. The control unit 12 further comprises a circuit switched provider bay 24 which operatively couples one or more public switched telephone network (PSTN) channels 42.

Subscriber Station

Figure 2:
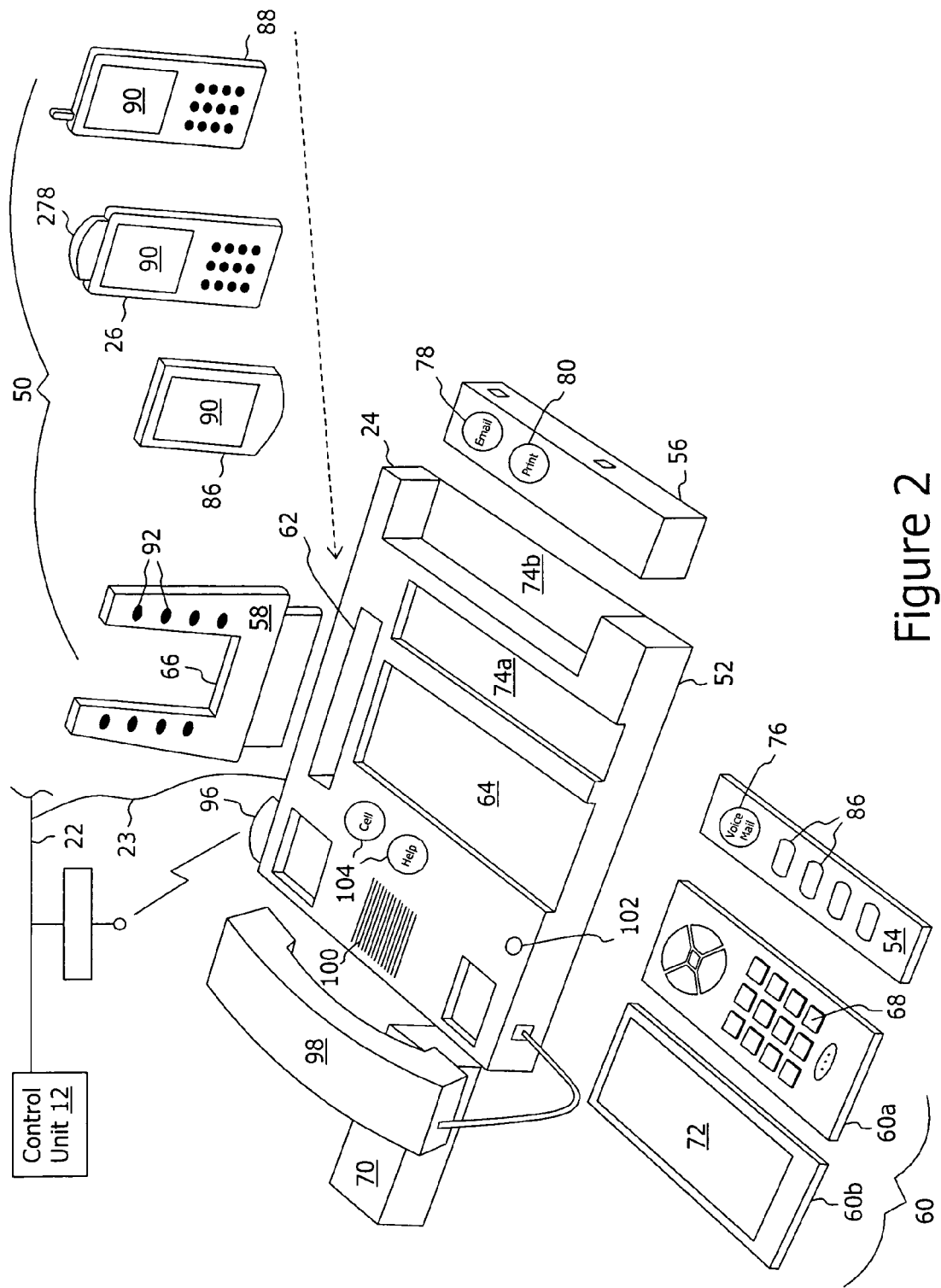
FIG. 2 is a perspective exploded view of a modular subscriber station in accordance with one embodiment of the present invention.

Referring to FIG. 2, a perspective view of an exemplary subscriber station 24 is shown. The subscriber station 24 includes a platform unit 52 that operatively couples to the control unit 12 via either a wireless communication link between a platform unit network circuit 96 and the wireless network 22 or a direct network connection 23 between the platform unit 52 and the backbone network of the wireless network 22.

A plurality of functional modules 54, 56, 58, and 60 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60a may include a plurality of buttons 68 in an arrangement similar to a typical telephone key pad to provide for subscriber input in a manner similar to that of a traditional telephone handset. The modular subscriber interface 60b may include a liquid crystal touch panel display 72 to provide for subscriber input through virtual buttons visible thereon.

The platform unit 52 further includes a first function specific docking platform 74a and a second function specific docking platform 74b, each of which will couple to a plurality of function specific modules 54 and 56. The first function specific docking platform 74a is a shallow platform for coupling to function specific modules that primarily comprise function specific buttons or other circuits that may be placed within a thin module. The second function specific docking platform 74b is a larger platform for coupling to function specific modules with more complex internal circuits requiring the additional size.

In the exemplary embodiment, the function specific module 54 may include subscriber interface buttons configured for enhancing dialog communication through the subscriber station 24 such as an audio message control 76 for single button access to audio message files and dialog management controls 86 for single button control of enhanced dialog management functions.

The function specific module 56 may include circuits configured for enhancing data communication through the subscriber station 24 such as an electronic message control 78 for single button access to subscriber electronic messages, a print control 80 for single button initiation of the printing of a subscriber electronic message file, and multiple data networking ports 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52. The modular docking interface further includes a plurality of control buttons 92 for single button selection of functions indicated on a display 90 on the subscriber device 50. Exemplary configurations for the modular subscriber device 50 include a subscriber data assistant 86, a subscriber wide area network communication device 88, and the wireless LAN dialog handset 26, each of which is discussed in more detail herein.

While operatively coupled to the platform unit 52, the subscriber device 50 becomes an integral part of the subscriber interface of the subscriber station 24. A liquid crystal display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the display 90 adjacent to the controls 92.

The platform unit 52 may further include one or more of the following elements: a handset 98 similar to a traditional telephone handset to provide a subscriber voice interface, a speaker 100 and a microphone 102 to provide a hands-free subscriber voice interface, a modular battery pack 70 (which fits within a battery pack bay that is not shown) for operating power when the subscriber station 24 is uncoupled from a line voltage, an on/off hook control button (or switch), and a help control button 104, a WAN control button 104, and a directory control button 107, for single button selection of certain functions such as a help function, a wide area network communication function, display of a contact directory respectively.

Figure 3:
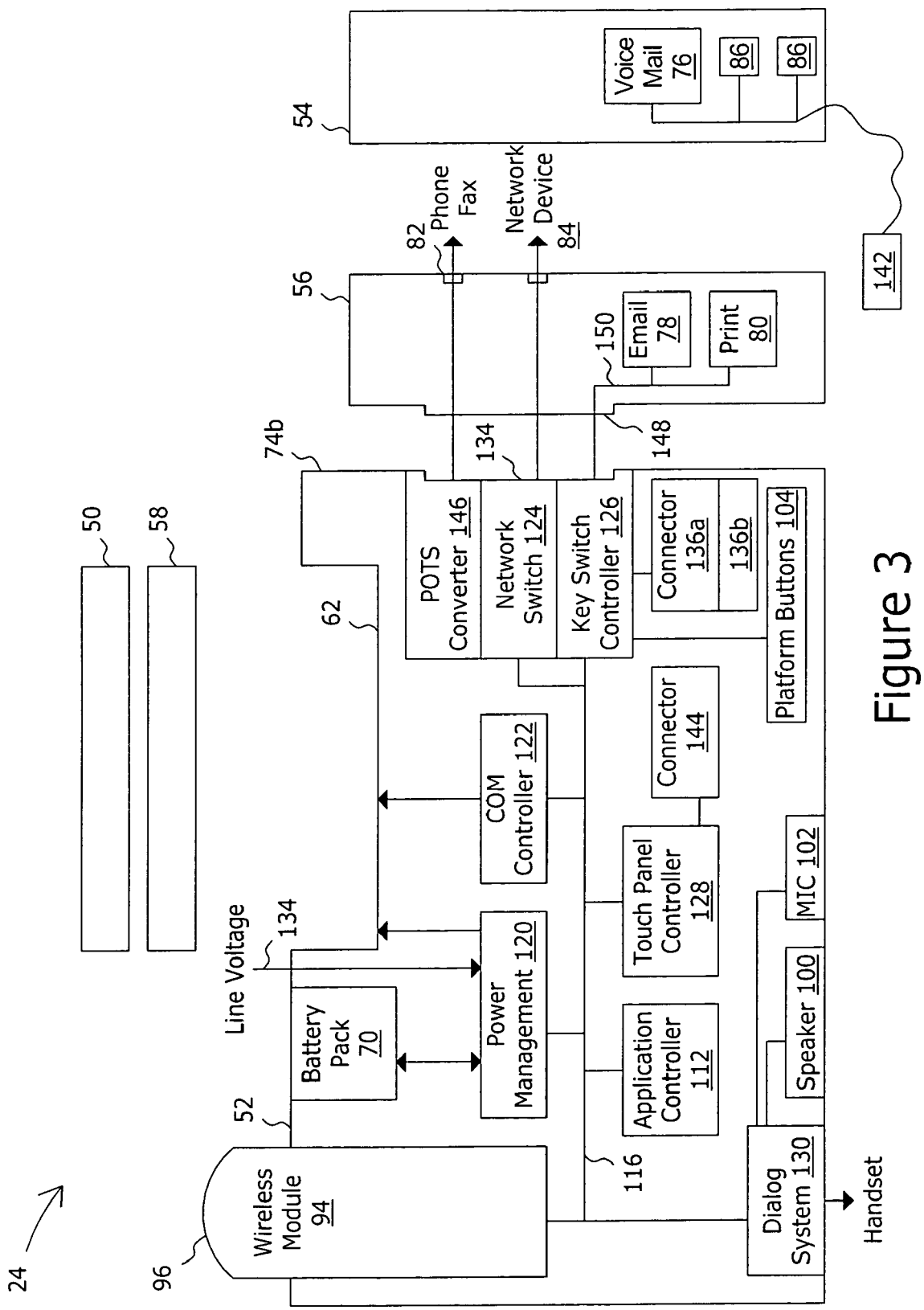
FIG. 3 is a block diagram of a subscriber station in accordance with one embodiment of the present invention.

FIG. 3 shows a block diagram of the subscriber station 24. The platform unit 52 includes a controller 112 operating a packet voice application 113, a subscriber station application 115 (FIG. 6), and applicable drivers for a plurality of peripheral controllers. The controller 112 is coupled to a local bus 116 that interconnects the application controller 112 with each of the plurality of peripheral controllers that include a wireless module 94, a power management controller 120, a communication controller 122, a network switch controller 124, a key switch controller 126, a touch panel controller 128, a plain old telephone service (POTS) converter 146, and a voice communication system 130.

The wireless module 94 operatively couples the platform unit 52 with the control unit 12 over the wireless LAN 22 (both of FIG. 1). The power management controller 120 selectively receives input power from the battery pack 70 or external line voltage 134. The power management controller 120 includes appropriate circuits for converting the input power voltage to appropriate operating power required by each component of the subscriber station 24. Additionally, the power management controller 120 includes appropriate circuits for charging the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the controller 112 such that the platform 52 can exchange data with the modular subscriber device 50. In the exemplary embodiment, the communication controller is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and the selection of a physical medium is not critical to this invention.

The network switch controller 124 provides a network data port circuit which enables the controller 112 to communication with another network computing circuit over a network interface. The network switch controller 124 is coupled to a bus port 135 within the function specific docking platform 74b for coupling to a mating port 148 on the function specific module 56.

The key switch (e.g. button) controller 126 is coupled to: a connector 136a which in turn is coupled to a mating connector on the modular subscriber interface unit 60a (FIG. 2) for interconnecting the buttons 68 to the key switch controller 126; a connector 136b which in turn is coupled to a mating connector 142 on the function specific module 54 for interconnecting the buttons 76 and 86 to the key switch controller 126; the bus port 135 which in turn is coupled to a mating port 148 on the function specific module 56 for interconnecting the buttons 78 and 80 to the key switch controller 126; and the help control button 105, the WAN control button 104, the directory button 107, and the on/off hook button (or switch) 109. In the exemplary embodiment, the key switch controller 126 may drive row and column signals to the various buttons and, upon detecting a short between a row and a column (e.g. button activation) reports the button activation to the controller 112 over the bus 116.

The touch panel controller 128 is coupled to a connector 144 which in turn is coupled to a mating connector on the modular subscriber interface unit 60b (FIG. 2) for interconnecting the touch panel 72 to the touch panel controller 128. In the exemplary embodiment, the touch panel controller 128 may include a separate display control circuit compatible with the resolution and color depth of the display of touch panel 72 and a separate touch panel control circuit for detecting subscriber contact with the touch panel 72.

The audio communication system 130 generates analog audio signals for driving the speaker 100 (or the speaker in the handset 98 of FIG. 2) and detects input from the microphone 102 (or the microphone in the handset 98) under the control the packet voice application 113 operated by the controller 112.

The POTS converter circuit 146 provides a standard POTS port signal (e.g. tip and ring) for operation of a traditional telephone or a traditional fax machine coupled to a POTS port 82 on the function specific module 56. In operation the POTS converter 146 circuit interfaces between the POTS signal and the application controller 112.

Control Unit

Figure 5:
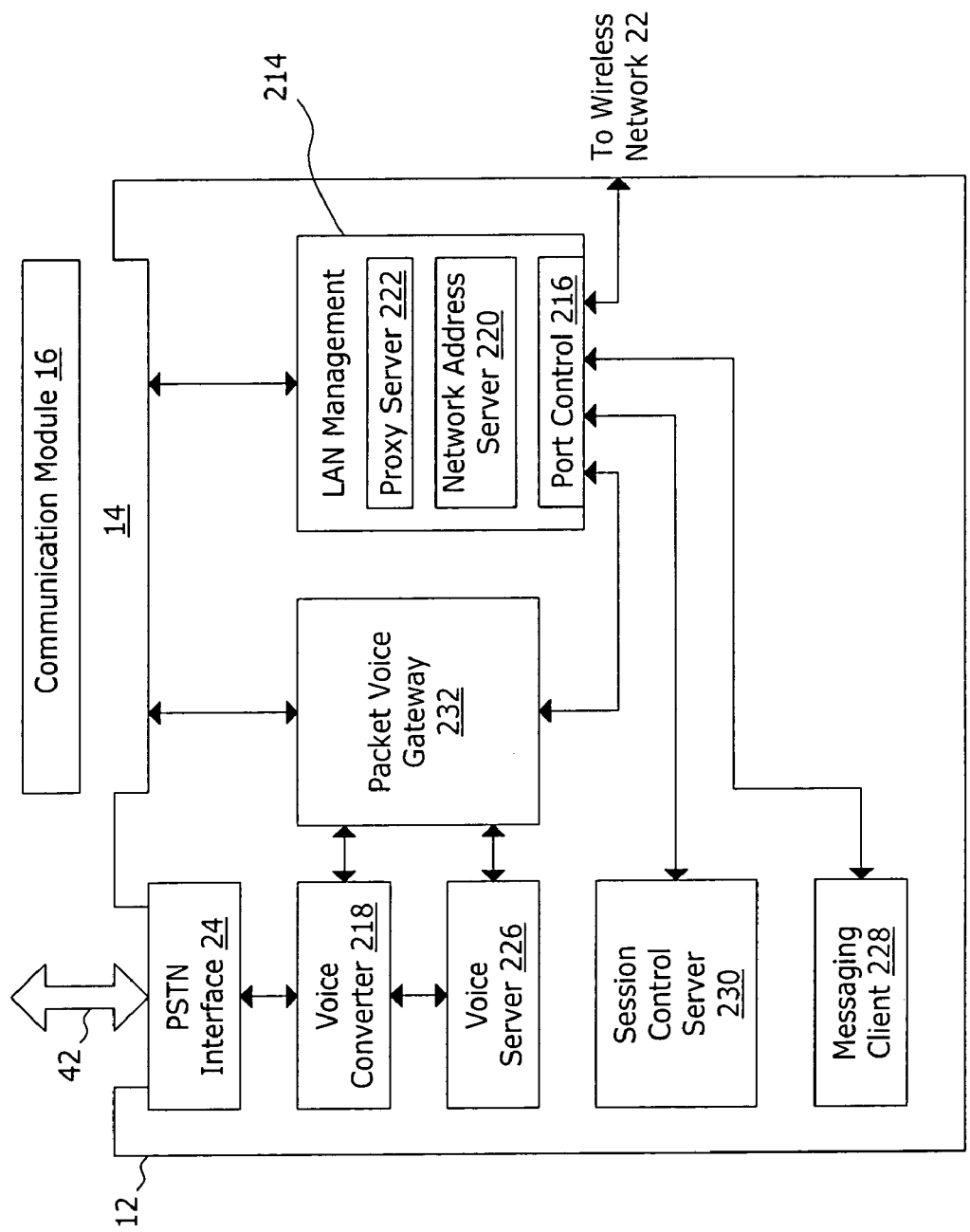
FIG. 5 is a block diagram of a multi-media communication management system controller in accordance with one embodiment of the present invention.

FIG. 5 shows a block diagram of the control unit 12 in accordance with an exemplary embodiment of the present invention. As discussed previously, the control unit 12 includes a multi media communication service provider bay 14 which operatively couples one of a plurality of communication medium modules 16 to the control unit 12 for providing an interface to a service provider's multi-media communication medium. The control unit 12 further includes a local area network management system 214, a voice converter circuit 218, a voice server 226, a packet voice gateway 232, a session control server 230, messaging client 228, and a subscriber contact directory database 234.

The local area network management system 214 manages the communication of data between the control unit 12 and each of the local communication devices 20 (FIG. 1). The local area network management system 226 may include an address server 220 for assigning a network address (from a block of available network addresses) to each local communication device 20 upon the local communication device subscribing to the wireless network 22 and requesting a network address. The local area network management system 214 may also include a proxy server 222 for communicating with remote devices via the service provider multi-media communication medium 18 on behalf of each of the local communication devices 20.

A port control circuit 216 may interconnect the local area network management system 214 to each of the wireless network 22, the packet voice gateway 232, the session control server 230, and the messaging client 228 over standard network port connections.

The messaging client 228 provides for authenticating a subscriber to a remote messaging server (not shown) coupled to the service provider multi-media communication medium 18 and copying a plurality of subscriber messages from such messaging server.

The voice server 226 provides audio prompts for providing a voice interface to accept an audio message for a subscriber, store the message as a digital file, and send the digital file to the remote messaging server associated with the subscriber.

The session control server 230 operates the protocols for sending multi-media content messages and control messages to each local communication device 20 over the wireless local area network 22. In the exemplary embodiment, the communications between the session control server 230 and each local communication device occurs using tagged messages. The tag for each message identifies the content of the message to the recipient local communication device 20. The packet voice gateway 232 operates provides real time voice communications between local communication devices 20 and between a local communication device 20 and a remote voice communication device over either the multi-media communication service provider medium 14 or the circuit switched channel 42. The packet voice gateway 232 includes a table 233 which affiliates each subscriber device 50 with the subscriber station 24 serving the subscriber device 50.

The packet voice gateway 232 receives audio session signaling from each of the subscriber stations 24, the service provider medium 14, and the circuit switched channel 42 (via the voice converter 218) and established audio session signaling to destination network address in accordance with the table 233. After signaling an audio session channel is established between the packet voice gateway 232 and the subscriber station 24 and an audio session channel is established between the packet voice gateway 232 and the destination. The packet voice gateway 232 relays audio session communications between the two channels.

The subscriber contact database 234 (FIG. 6) includes a contact directory for each of a plurality of subscribers. Within each contact directory are a plurality of contact files that include basic information associated with the contact such as company name, telephone number, e-mail address, mailing address, fax number and the like. The contact directory 234 provides destination information which may be used by the packet voice gateway 232 and the session control server 230 for establishing communication channels from a subscriber station 24 to a selected contact.

The voice converter 218 functions to convert audio signals compatible with the circuit switched channel 42 to packet voice signals compatible with the voice server 226 and the packet voice gateway 232 and, in reverse, functions to convert packet voice signals to audio signals compatible with the circuit switched channel 42. Further, the voice converter 218 functions to convert a coded extension number (e.g. DID signal) that may be included within audio session signaling through the PSTN interface 24 to a digital format compatible with the packet voice gateway 232. Each of the local area network management system 214, the packet voice gateway 232, the voice converter 218, the voice server 226, the session control server 230, and the messaging client 228 operate as an integrated system under the control of the session control server 230.

Subscriber Data Assistant

Figure 6:
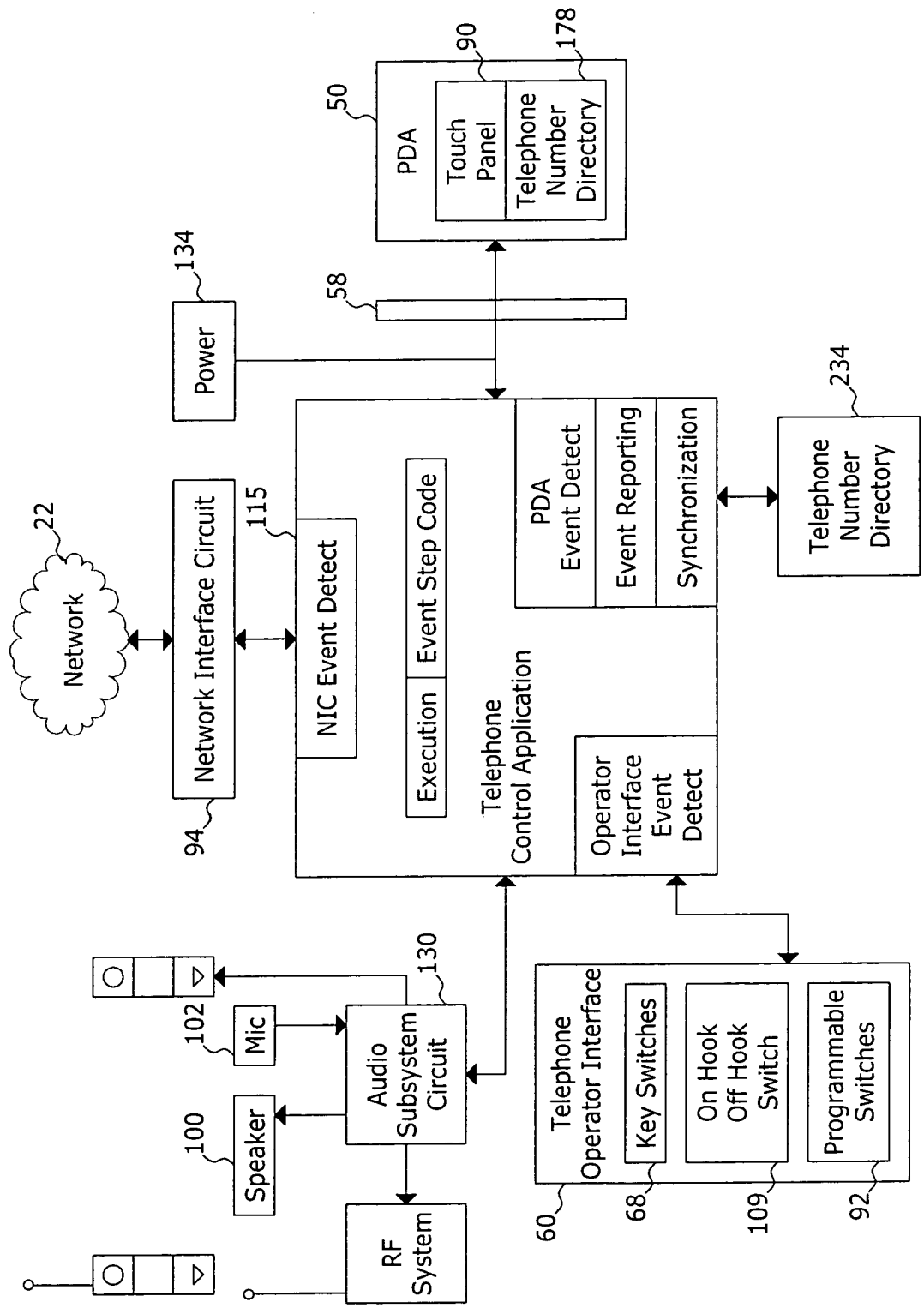
FIG. 6 is a block diagram of various components of a multi-media communication management system in accordance with the present invention.
Figure 7:
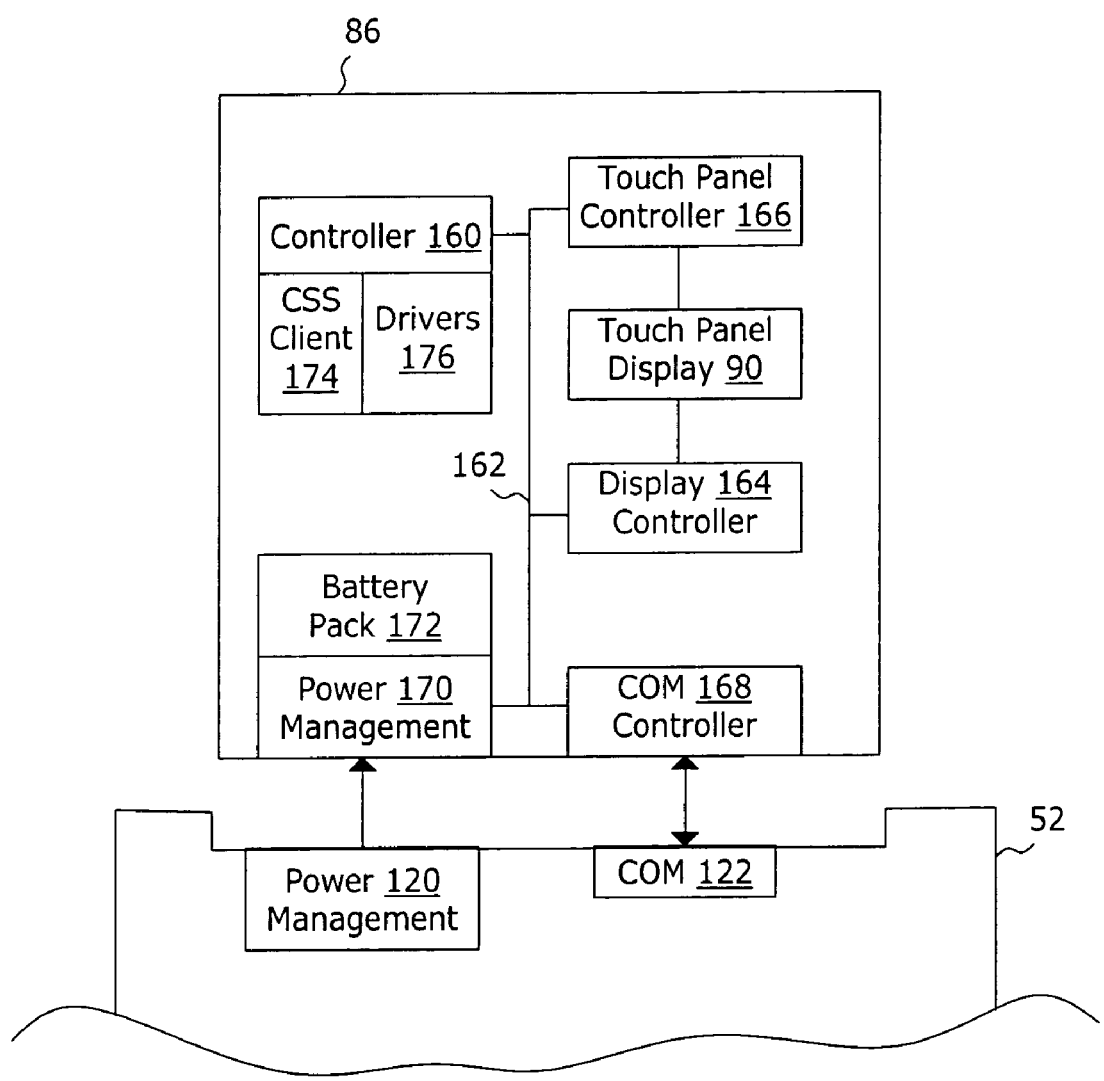
FIG. 7 is a block diagram of a subscriber data assistant in accordance with one embodiment of the present invention.

Turning to FIG. 7, exemplary structure of a subscriber data assistant 86 is shown. The subscriber data assistant 86 includes a controller 160 operating a communication subscriber station client application 174, a subscriber contact directory application 178 (FIG. 6), and applicable drivers 176 for a plurality of peripheral controllers. The controller 160 is interconnected to the plurality of peripheral controllers by an internal bus 162. Because of the small size and the portability of the subscriber data assistant 86, the touch panel 90 provides the primary subscriber interface. The touch panel 90 is controlled by a display controller 164 and a touch panel controller 166. The display controller 164 drives the liquid crystal display of touch panel 90 using signals compatible with the resolution and color depth of the display 90. The touch panel controller 166 detects user activation of the touch panel 90.

A communication controller 168 is also coupled to the bus 162 and operates under control of the application controller 160. In the exemplary embodiment, the communication controller 168 is a serial communication controller that is compatible with the communication controller 122 of the platform unit 52 (both of FIG. 3) such that data communication may occur between the platform unit 52 and the subscriber data assistant 86 when the subscriber data assistant 86 is operatively coupled to the platform unit 52.

A power management circuit 170 selectively receives input power from a battery pack 172 or from the power management circuit 120 in the platform unit 52. The power management circuit 170 includes appropriate circuits for converting the input power voltage to appropriate operating power required by each component of the subscriber data assistant 86. Additionally, the power management circuit 170 includes appropriate circuits for managing charging of the battery pack 172 when subscriber data assistant 86 is coupled to the platform unit 52.

The communication subscriber station client application 174 provides for displaying multi-media communication management information under control the platform unit 52 when coupled to the platform unit 52. In the exemplary embodiment the communication subscriber station client application 174 receives content messages and control messages from the platform unit 52 in the form of tagged messages. After receipt of the tagged messages, the communication subscriber station client application 174 builds a display document to display the communication management information represented by tagged content messages in accordance with display layout control messages that are compatible with the size, resolution, and color depth of the touch panel display 90. The display document is then displayed on the touch panel display 90.

Figure 4A:
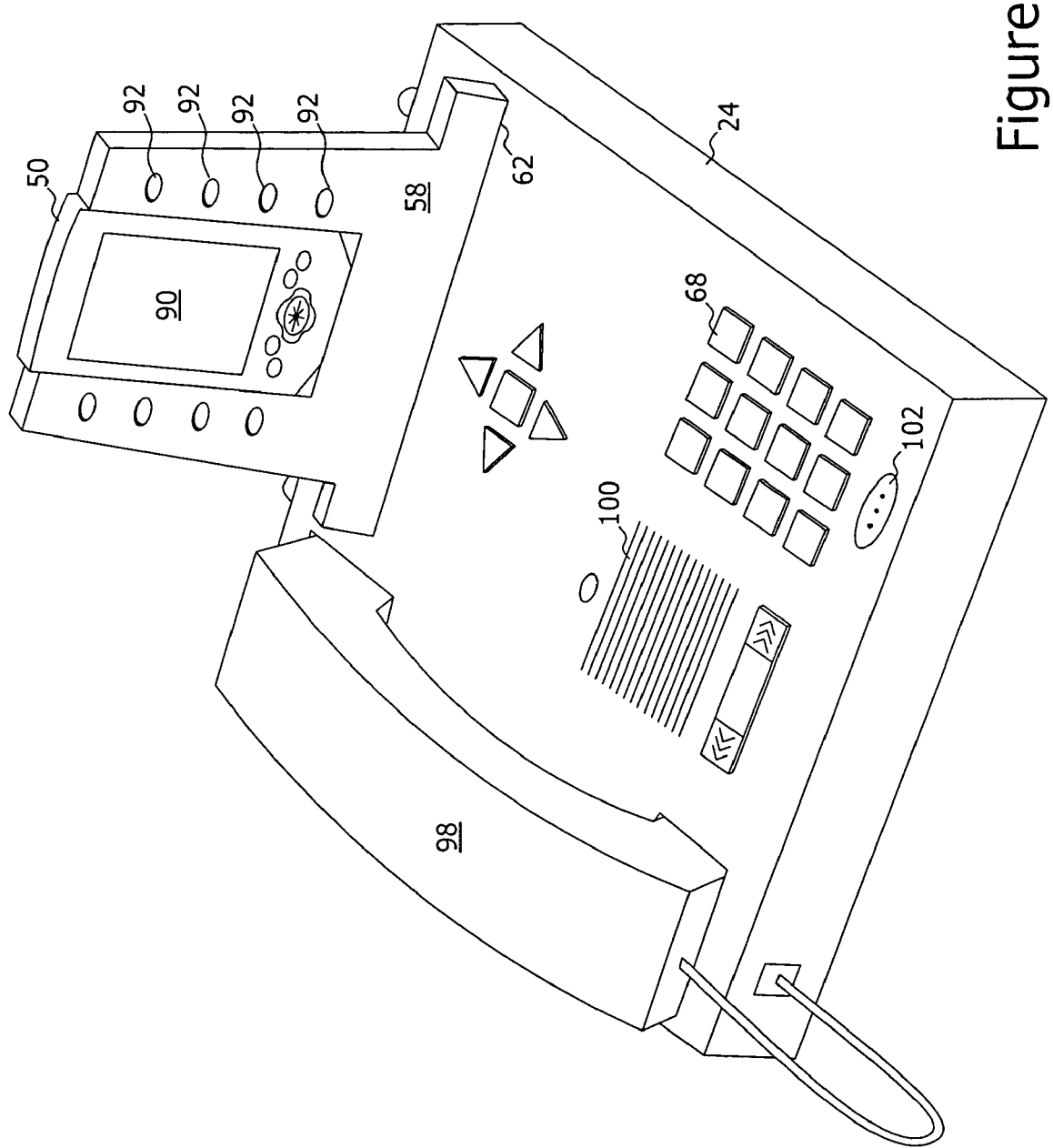
FIG. 4a is a perspective view of a subscriber station in accordance with one embodiment of the present invention.
Figure 4B:
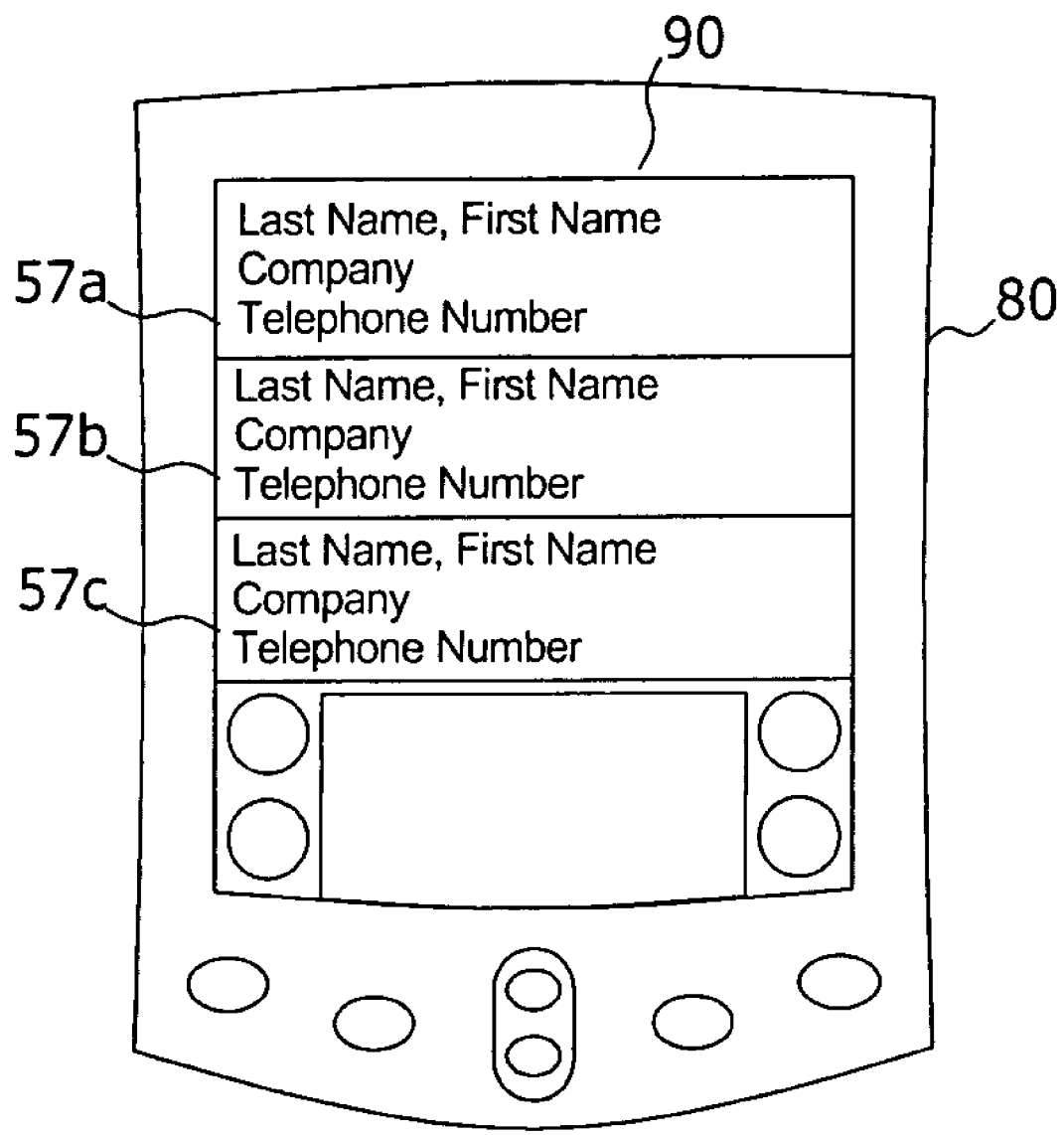
FIG. 4b is a view of a subscriber data assistant in accordance with one embodiment of the present invention.

The subscriber contact directory application 178 (FIG. 6) maintains a contact directory file for each of a plurality of subscriber contacts 57 as shown in FIG. 4b. The application 178 also may permit the subscriber to add contact information and edit contact information through the touch panel 90 when the subscriber data assistant 86 is uncoupled from a subscriber station 24.

It should be appreciated that in additional to operating the drivers 176, the communication subscriber station client application 174, and the subscriber contact directory application 178, the controller 160 may optionally operate any of the other software applications that are commercially available for portable data assistants (PDAs). While operation of such PDA applications may be useful to the subscriber, it is not critical to the operation of the present invention.

Subscriber Wide Area Network Communication Device

Figure 8:
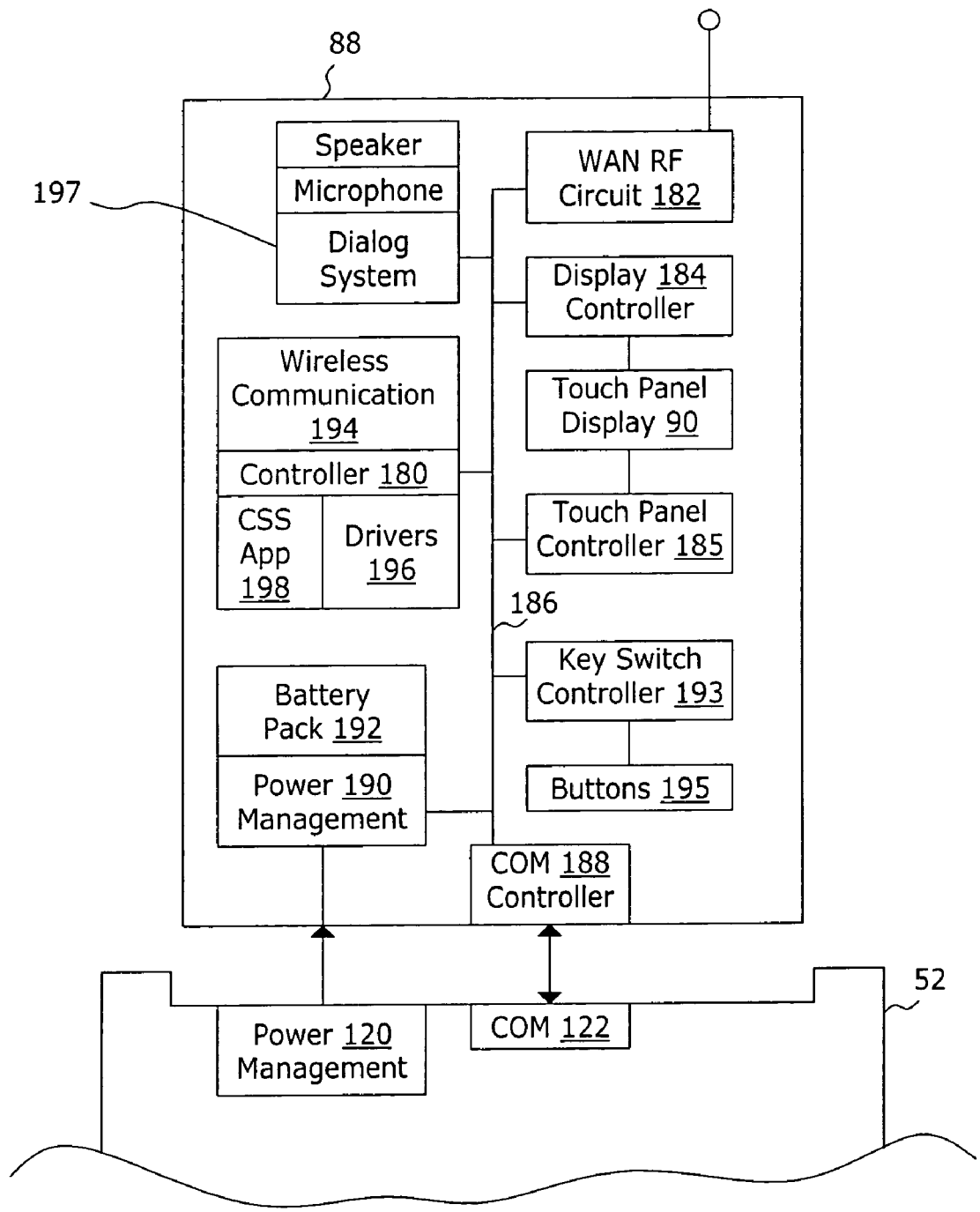
FIG. 8 is a block diagram of a wide area network communication device in accordance with one embodiment of the present invention.

Turning to FIG. 8, exemplary structure of a subscriber wide area network communication device 88 is shown. The wide area network communication device 88 includes a controller 180 operating a communication subscriber station application 198, the subscriber contact directory application 178, a wireless communication application 194, and applicable drivers 196 for a plurality of peripheral controllers. The controller 180 is interconnected to the plurality of peripheral controllers by an internal bus 186. The peripheral controllers include a wide area network RF circuit 182, a voice system 197, a display controller 184, a touch panel controller 185, a key switch controller 193, a communication controller 188, and a power management system 190.

The wide area network RF circuit 182 may be a circuit for transmitting and receiving signals from a wide area network service provider's medium under control of the wireless communication application 194. Exemplary wide area network service provider mediums include an analog or digital cellular or PCS telephone RF system.

The key switch controller 193 is coupled to the control buttons 195. The key switch controller 193 drives row and column signals to the control buttons 195 and, upon detecting a short between a row and a column indicating button activation, reports the activation to the controller 180. The control buttons 195 may be used by a subscriber for operating the wide area network communication device 88 when uncoupled form the platform unit 52.

The voice system 197 includes a speaker and a microphone. Under control of the wireless communication application 194, the voice system 197 may provide a subscriber voice interface for an audio session with a remote device over the wide area network service provider's medium.

The display controller 184 drives the display 90 using signals compatible with the resolution and color depth of the display 90. The display 90 may optionally be a touch panel display 90 and the touch panel controller 185 detects user activation of the touch panel 90.

The communication controller 188 may be a serial communication controller compatible with the communication controller 122 in the platform unit 52 such that data communication may occur between the platform unit 52 and the wide area network communication device 88 when the wide area network communication device is operatively coupled to the platform unit 52.

The power management controller 190 operating with a battery pack 192, both of which may operate in a similar manner to the power management controller 170, and the battery pack 172 discussed with reference to FIG. 7.

Similar to the subscriber data assistant 86 (FIG. 7), when the wide area network communication device 88 is coupled to the platform unit 52, the communication subscriber station application 198 provides for displaying multi-media communication management information under control the platform unit 52 and provides for multi-media communication directly between the platform unit and the wide area network service provider medium.

In addition the communication subscriber station application 198 may receive messages from the platform unit 52 which may be multi-media communication messages for communication over the wide area network service provider medium. Each message includes a tag that identifies the contents of the message. After receipt of a tagged message, the communication subscriber station application 198 may identify whether the message is for communication with the wide area network service provider medium or whether it is multi-media communication management information for display.

When the message is for communication with the wide area network service provider medium, the communication subscriber station application 198 will reformat the message to a format compatible with wide area network service provider medium transmission standards and transmit the message using the wide area network RF circuit 182.

The wide area network communication device 88 may also receive signals from the wide area network service provider medium via the wide area network RF circuit 182. When received, the communication subscriber station application 198 reformats the messages into a plurality of tagged messages for communication to the platform unit 52 and sends the tagged messages to the platform unit 52 via the communication controller 188.

Wireless Voice Handsets

Figure 9:
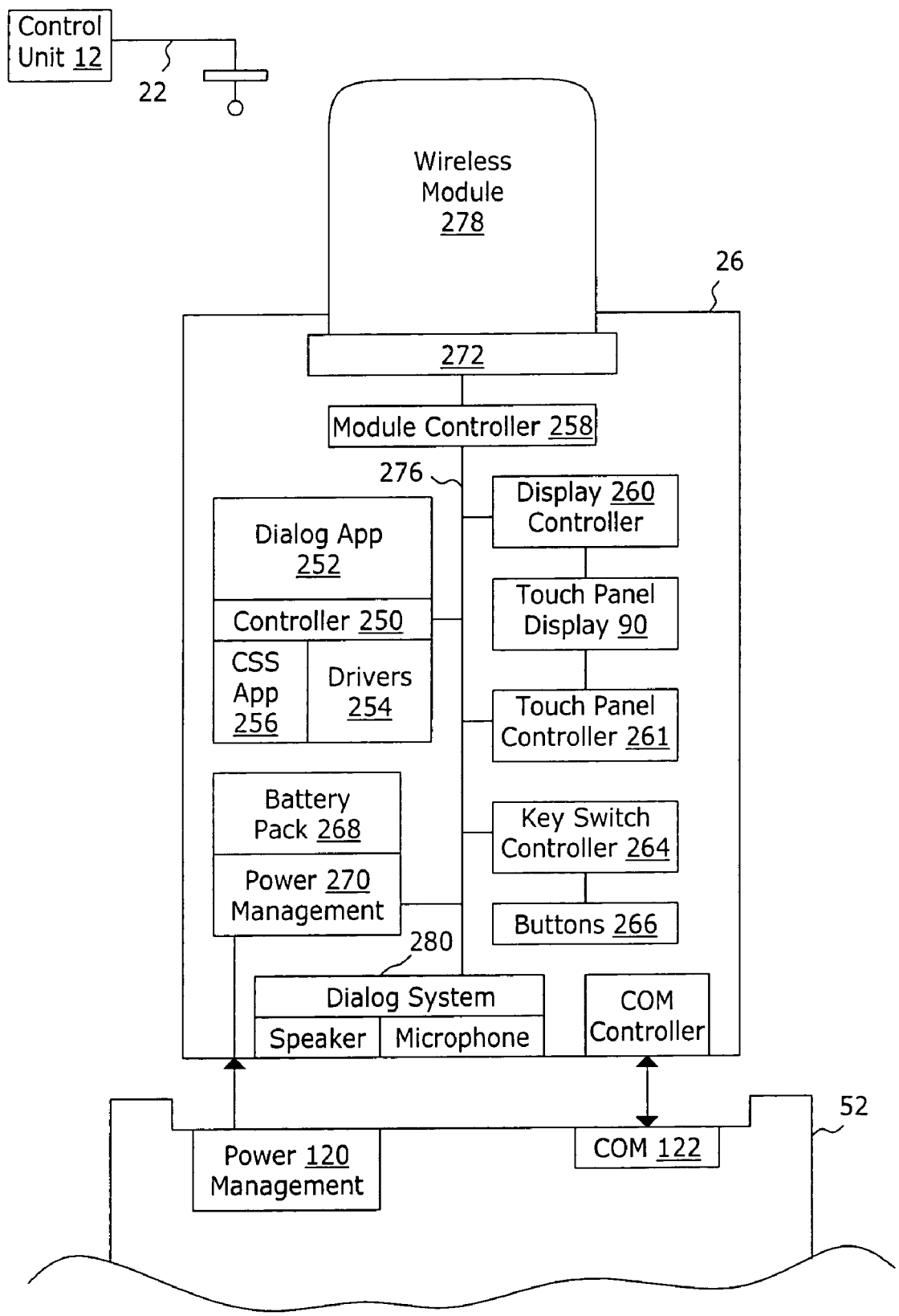
FIG. 9 is a block diagram of a wireless dialog handset in accordance with one embodiment of the present invention.

FIG. 9 shows a block diagram of an exemplary wireless dialog handset 26. The wireless voice handset 26 includes a network circuit 278 and a controller 250 that operates a communication subscriber station application 256, the subscriber contact directory application 178 (FIG. 6), a LAN communication application 252, and applicable drivers 254 for each of a plurality of peripheral controllers. The controller 250 is interconnected by a bus 276 to the plurality of peripheral controllers which include a module controller 258, a display driver 260, a touch panel driver 261, a key switch controller 264, and a power management circuit 270.

The module controller 258 operatively couples the network circuit 278 to the controller 250 such that the wireless voice handset 26 may communicate with the control unit 12 over the wireless LAN 22 (both of FIG. 1). In the exemplary embodiment, the module controller 258 may be a PCMCIA controller circuit and the network circuit 278 is configured as a PCMCIA card that coupled to the module controller 258 through a PCMCIA connector 272. The LAN communication application 252 operates the network circuit 278 for communicating with the control unit 12 using appropriate wireless signaling protocols.

The key switch controller 264 is coupled to the control buttons 266. The key switch controller 264 drives row and column signals to the control buttons 266 and, upon detecting a short between a row and a column indicating button activation, reports the activation to the controller 250. The control buttons may be used by a subscriber for operating the wireless voice handset 26 when uncoupled form the platform unit 52.

The display controller 260 drives the display 90 (optionally a touch panel display 90) using signals compatible with the resolution and color depth of the display 90. The touch panel controller 261 detects user activation of the touch panel display 90. The power management controller 270 operates in conjunction with a battery pack 268, both of which may operate in a similar manner to the power management controller 170, and the battery pack 172 discussed with reference to FIG. 7.

When the wireless voice handset 26 is coupled to the platform unit 52, the communication subscriber station application 256 provides for displaying multi-media communication management information under control the platform unit 52. Additionally, the communication subscriber station application 174" may receive multi-media communication management information content messages and control messages directly from the control unit 12 via the wireless network 22. After receipt of the tagged messages from either the platform unit 52 or the control unit 12, the communication subscriber station application 174" builds a document to display the communication management information represented by the tagged content messages in accordance with display layout control messages that are compatible with the size, resolution, and color depth of the touch panel display 90. The display document is then displayed on the touch panel display 90.

Session Control Server

Referring to FIG. 4 in conjunction with the tables of FIGS. 10a–10e, exemplary operation of the session management server 230 providing multi-media communication management in accordance with the present invention is shown.

The session control server 230 operates as a multi-tasking event driven state machine. A separate state machine is operated by the session control server 230 for each of the local communication devices 20 (FIG. 1). During operation of each state machine, the session control server 230 receives event signals from each of the voice server 218, the messaging client 228, the packet switched voice gateway 232, the multimedia communication service provider medium 18, and the particular local communication device 20 for which the state machine is operated. Each state machine includes multiple processing states and within each processing state there is a plurality of events that may be detected by the session control server 230. Each event has a processing state dependent processing sequence that is processed by the session control server 230.

The table of FIG. 10a represents a start up state. In the start up state, the session control server 230 is waiting for an open session request from a new subscriber device 24 on a predetermine port. When a subscriber station 24 has just operatively coupled to the local area network 22, obtained a network address from the network address server 220, and is ready to operate, it is programmed to send an open session request to a predetermined network address (matching that of the session control server 230) on the predetermined port. Event 300 represents receipt of an open session request from the subscriber station 24. In response, various steps are performed to initiate management of multi-media communications of the subscriber station 24 that include: providing logon scripts to the subscriber station 24; obtaining an interface configuration of the subscriber station 24; providing main menu display content and main menu layout control messages to the subscriber station 24 that are compatible with the particular display (if any) that is included in the interface configuration of the subscriber station 24; and transitioning to a main menu state 304 as represented by FIG. 10b.

When in the main menu state 304, the session control server 230 is waiting for one of a plurality of events to occur that may include event 302 that represents a message indicating subscriber selection of a menu choice from the main menu, event 308 that represents a message from the subscriber station 24 indicating that a subscriber device 50 (FIG. 1) has been operatively coupled to, and is ready to be served by, the subscriber station 24, and event 310 that represents a message indicating subscriber activation of the help control 105 (FIG. 2).

In response to event 302, the session control server 230 transitions to a state corresponding to the selected menu choice. In response to event 308, the session control server performs a plurality of steps to associate the subscriber device 50 with the subscriber station 24. Messages representing extraction control scripts may be sent to the subscriber station 24 which provide for the subscriber station to obtain identification information associated with the subscriber device 50 and send the identification information to the session control server 230. Messages are received from the subscriber device 50 to provide for receiving subscriber contact files 178 (FIG. 6) to update the subscriber contact directory database 234 (FIG. 6) with any edits to the subscriber contact files that may have been made when the subscriber device 50 was uncoupled form the subscriber station 24. Subscriber contact information from the subscriber contact directory 234 may be communicated to the subscriber device 50 to update the subscriber contact files stored on the subscriber device 50. Main menu display content messages and main menu display layout control messages that are compatible with display 90 on the particular subscriber device 50 are sent to the subscriber station 24 to effect the display of a main menu on the display 90. Following completion of these steps, the session control server 230 transitions to a subscriber device main menu state 316 as represented by FIG. 10c.

In response to event 310, the session control server 230 provides control scripts to the subscriber station 24 to provide for the subscriber station 24 to establish the appropriate audio session channels to the voice gateway 232 and for the voice gateway 232 to access the session control server 230 through the voice converter 218, and transitions to an audio help state wherein a subscriber is directed through a sequence of help menu choices by audio prompts initiated by the session control server 230.

When in the subscriber device main menu state 316 of FIG. 10c, the session control server 230 is waiting for one of the events associated with the subscriber device main menu state 316 that include event 312 that represents a message indicating subscriber selection of a menu choice from the subscriber device main menu, event 320 that represents a message indicating subscriber activation of the help control 104 (FIG. 2), event 322 that represents a message indicating subscriber activation of the message control 78 (FIG. 2), event 324 that represents a message indicating subscriber activation of the audio message control 76 (FIG. 2), event 314 that represents a message indicating subscriber activation of the directory control (FIG. 2), and event 326 that represents a message indicating that the subscriber device 50 is not longer served by the subscriber station 24.

In response to event 312, the session control server 230 transitions to a state corresponding to the selected menu choice. In response to event 320, the session control server 230 provides messages representing help menu display content and help menu display layout control in accordance with the parameters of the display 90 on the subscriber device 50 and then transitions to a graphic help state wherein the subscriber is directed through a sequence of graphic help menu choices through various levels of display menus provided to the subscriber station 24 through help menu display content messages and help menu display layout control messages. In response to events 322 or 324 the session control server 230 obtains messages associated with the subscriber device from a remote messaging server coupled to the service provider medium, sorts the messages in accordance with the message type selection, provides messages representing message list display content and message list display layout control in accordance with the parameters of the display 90 on the subscriber device 50, and then transition to a message list state 328 (FIG. 10d). In response to event 314 the session control server 230 obtains subscriber contact information that corresponds with the subscriber device, provides the directory content and display layout control messages to the subscriber station 24, and transition to a subscriber directory state 370 as represented by the table of FIG. 10e. In response to event 326 the control unit transitions to the main menu state 304 (FIG. 10b).

When in the message list state 328 of FIG. 10, the session control server 230 is waiting for one of a plurality of events associated with the message list state 328 that include event 334 that represents a message indicating that the subscriber has activated a control to obtain an audio message from the list (either by touch panel activation or by buttons 92 of FIG. 2), event 336 that represents a message indicating that the subscriber has activated a control to display a message from the list (either by touch panel activation of by buttons 92 of FIG. 2), event 338 representing a message indicating that the subscriber has activated the print control 80 (FIG. 2), event 340 that represents a message indicating subscriber activation of the help control 105 (FIG. 2), and event 342 that represents a message indicating that the subscriber device 50 is not longer served by the subscriber station 24.

In response to event 334 the session control server 230 communicates the selected audio message files to the subscriber station 24 and provides control scripts to the subscriber station 24 to provide for the subscriber station to output the message through the voice system 130. In response to event 336 the session control server 230 provides display content and display layout control that are compatible with parameters of the display 90 on the subscriber device 50 for display of the selected message and then transitions to a message display state. In response to event 338, the session control server 230 formats the selected message into a printer compatible file, send the print file to a printer coupled to the network 22, and return to the message list state 328. In response to event 340 the session control server 230 provides messages help menu display content and help menu display layout control messages in accordance with the parameters of the display 90 on the subscriber device 50 and then transitions to the graphic help state. In response to event 342 the control unit transitions to the main menu state (FIG. 10b).

When in the subscriber directory state 370 (FIG. 8e) the session control server 230 is waiting for an event associated with the subscriber directory state 370 which may include event 372 that represents receipt of a message representing a contact selection that indicates that either an applicable portion of the touch panel was activated or a particular button 92 (FIG. 2) was activated to indicate subscriber selection of a contact, event 374 that represents receipt of a message that indicates subscriber activation of the help control 105 (FIG. 2), and event 378 that represents a message indicating that the subscriber device 50 is no longer served by the subscriber station 24.

In response to event 372, the session control manager 230 communicates a control script to the subscriber station 24 that provides for the subscriber station 24 to establish the appropriate audio session channels to the voice gateway 232 and for the voice gateway 232 to establish an appropriate audio session channel to a destination associated with the selected contact. The control script may include a telephone number from the subscriber contact directory database 234 (FIG. 6) associated with the contact. Following communication of the control script, the session control server 230 transitions to an audio session state.

In response to event 374, the session control server 230 provides messages representing help menu display content and layout control and then transition to the graphic help state. In response to event 378, the session control server 230 transitions to the main menu state 304.

Communication Subscriber Station Application

Turning to FIG. 6, in the exemplary embodiment, the communication subscriber station application 115 is an event driven state machine. Within each processing state various events that are generated by one of the peripheral circuits may be detected by the communication subscriber station application 115 and, upon detecting an event, a certain string of processing steps that correspond to the particular event is performed by the communication subscriber station application 115.

Referring to the tables of FIG. 11 in conjunction with the block diagram of FIGS. 3 and 6, exemplary operational states of the communication subscriber station application 115 are shown. The start up state 346 represents the state of operation of the subscriber station 24 immediately after establishing a network connection with the control unit 22 via the network 22. Upon establishing a connection, event 366, the communication subscriber station application 115 initiates a session request to the session control server 230 on a predetermined port. Event 368 represents confirmation of the session from the session control server 230 and receipt of the logon script from the session control server 230. In response to event 368, the subscriber device processes the script which may include detecting the interface configuration of the subscriber device 24, providing the interface configuration to the session control server 230, and transitioning to the base state 344.

The base state 334 represents the communication subscriber station application 115 waiting for an event signal from one of the peripheral devices which may include event 354 that represents subscriber touch panel activation, event 356 that represents subscriber activation of one of the control buttons, event 358 that represents receipt of display content and display layout control messages from the controller 12, event 360 that represents receipt of a message comprising a processing script from the controller 12, event 362 that represents a wide area network telephone signal through a wide area network subscriber device 88 (FIG. 1), event 364 that represents detecting a subscriber device 50 being coupled to the subscriber station 24, event 350 that represents receipt of a message from the controller 12 directed to the subscriber device 50, and event 352 that represents receipt of a message from the subscriber device 50 directed to the controller 12.

In response to event 356, the application 115 provides a message indicating the touch panel activation event to the session control server 230. In response to event 358, the application 115 provides a message indicating activation of the particular control button to both the packet voice application 113 and the session control server 230. In response to event 358, the application 115 either updates the display 72 on the touch panel unit 60b (both of FIG. 2) via the touch panel controller 128 or provides the messages representing the display content and the display layout control to the subscriber device 50 via the communication controller 122 for the subscriber device 50 to update its own display. In response to event 360, the subscriber device processes the script as provided including interfacing with any of the peripheral devices as required by the script. For example, the extraction control script received from the session control server 230 may require interrogating the subscriber device for identity information and providing a message representing such identification information to the session control server 230. In response to event 362, the subscriber device may enter a wide area network communication state wherein it relays a digital representation of voice signals between the dialog system 130 and a wide area network subscriber device 88 such that a voice conversation may take through the wide are network. In response to event 364, the subscriber device 24 may send a message indicating that a subscriber device 50 is being initialized by the subscriber station 24 (which corresponds to event 308 of FIG. 10b) and then return to the base state 344. In response to event 350, the application 115 provides the messages to the subscriber device 50 via the communication controller 122. In response to event 352, the application 115 provides the messages to the session control server 230 via the network.

Packet Voice Application

The packet voice application also operates as an event driven state machine. Again, each state includes a plurality of events that may occur when operating in the state and a sequence of steps that the packet voice application processes in response to the event. Referring to the tables of FIGS. 10a and 10b in conjunction with the block diagram of FIG. 3, exemplary operational states of the packet voice application 113 are shown.

The standby state 380 represents the packet voice application in an inactive mode waiting for an event that may include event 388 which represents receipt of an audio session set up signal from the packet voice gateway 232, event 390 that represents receipt of a message from the communication subscriber station application 115 that represents activation of the on/off hook button (or switch) 109, and event 392 that represents receipt of a message from the communication subscriber station application 115 instructing the packet voice application to set up an audio session with a specified destination.

In response to event 388, the packet voice application transitions to a call signaling state 382 and reports the transition to the communication subscriber station application 115. In response to event 390, the packet voice application 113 transitions to an off hook state 384 and reports the transition to the communication subscriber station application 115. In response to event 392, the packet voice application sends applicable call signaling messages to the packet voice gateway 232 to set up the audio session channel with the voice gateway 232 and provides for the voice gateway 232 to set up an appropriate audio session channel with the destination. The packet voice application then transitions to the call signaling state 382, and reports the transition to the communication subscriber station application 115.

When in the call signaling state 382, the packet voice application is providing a ring signal to the subscriber as either a ring signal to notify the subscriber of an incoming audio session or to notify the subscriber that an audio session set up signal has been sent to the packet voice gateway 232 and a destination device is "ringing" waiting for a remote party to effectively answer the call. During the ringing state 382 the packet voice application may detect events such as event 394 that represents receipt of a message that represents activation of the on/off hook button 109 (FIG. 2), event 396 that represents termination of call signaling by the packet voice gateway 232, event 398 that represents receipt of a ready for audio session signal from the packet voice gateway 232 if the packet voice application 113 is ringing to notify the subscriber that a remote device is ringing.

In response to either event 394 (and event 396 if the subscriber station 24 is currently off hook), the packet voice application returns to the standby state 380 and report the state transition to the communication subscriber station application 115. In response to event 398 (and event 396 if the subscriber station 24 is current on hook) the packet voice application transitions to an audio session state 386 and report the transition to the communication subscriber station application 115.

When in the off hook state 384, the packet voice application may be generating a dial tone through the voice system 130 as a prompt for the subscriber to use the keypad to enter a telephone number. During the off hook state 384, the packet voice application 113 may accept events such as event 400 that represents receipt of a message that represents key pad activation, event 402 that represents validation of a number sequence as a complete telephone number that can be used to set up an audio session, and event 404 that represents receipt of a message that represents activation of the on/off hook button 109 (FIG. 2).

In response event 400 the packet voice application 113 generates a DTMF tone through the voice system 130 to provide the subscriber with audio feedback and stores the numeral as part of the sequence for validation. In response to event 402, the packet voice application initiates call signaling to the packet voice gateway 232 utilizing the validated number as the destination, transitions to the call signaling state 382, and reports the transition to the communication subscriber station application 115. In response to event 404, the packet voice application 113 transitions to the standby state 380 and reports the transition to the communication subscriber station application 115.

When in the audio session state 386 the packet voice application 113 is relaying messages representing a real time audio dialog between the voice system 130 and the packet voice gateway 232. When in the audio session state 386, the packet voice application 113 may accept events such as event 406 that represents termination of the audio session by the packet voice gateway 232, event 408 that represents receipt of a message that represents subscriber activation of a keypad numeral, and event 410 that represents receipt of a message that represents activation of the on/off hook button 109 (FIG. 2).

In response to event 406, the packet voice application 113 returns to the off hook state and reports the transition to the communication subscriber station application. In response to event 408, the packet voice application 113 generates a DTMF tone in the audio session signals to the packet voice gateway 232. In response to event 410, the packet voice application 113 returns to the stand by state 380 and reports the state transition to the communication subscriber station application 115.

It should be appreciated that the systems and methods of the present invention provide for the communication and control of multi-media messages by a central control unit and a plurality of subscriber stations operating under the control of the control unit. This coordinated and integrated system architecture enables the subscriber station to merge the functionality and internal data of various portable subscriber devices into the subscriber station, to direct the functionality and data of the subscriber station to a selected one of the portable subscriber devices, and to provide the subscriber with a simple subscriber interface.

Although the invention has been shown and described with respect to certain preferred embodiments, it is obvious that equivalents and modifications will occur to others skilled in the art upon the reading and understanding of the specification. For example, the above described processing states, events, and processing steps for both the subscriber station 42 and the session control server 230 are exemplary states only for demonstrating operation and are not intended to limit the scope of the present invention. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed:

1. A subscriber multi-media communication management system for operation with a plurality of subscriber stations, at least a one of the plurality of subscriber stations being a selected subscriber station which includes a docking bay for operatively coupling a one of a plurality of subscriber devices to the selected subscriber station, the multi-media communication management system comprising:

a network communication circuit for multi-media communication with said plurality of subscriber stations;

a session control circuit for establishing a communication session with the selected subscriber station through the network communication circuit, comprising:

means for receiving a message from the selected subscriber station indicating that the one of the plurality of subscriber devices has been operatively coupled thereto;

means for accessing a subscriber contact directory associated with the one of the plurality of subscriber devices operatively coupled to the selected subscriber station, means for receiving data from the selected subscriber station indicating subscriber selection of a selected contact from the subscriber contact directory; and means for communicating a control message to the selected subscriber station which provides for the selected subscriber station to establish an audio session channel to a packet voice gateway and for the packet voice gateway to establish an audio session channel to a destination associated with the selected contact.

2. The subscriber multi-media communication management system of claim 1, wherein the session control circuit further comprises:

means for communicating at least a portion of the subscriber contact directory to the selected subscriber station; and means for communicating control messages to the selected subscriber station to effect the display of at least a portion of the subscriber contact directory.

3. The subscriber multi-media communication management system of claim 2, wherein the session control circuit further comprises:

means for identifying parameters of a display associated with the selected subscriber station; and means for communicating display layout messages compatible with the parameters to the selected subscriber station.

4. The subscriber multi-media communication management system of claim 2, wherein the session control circuit further comprises:

means for communicating control messages to the selected subscriber station to effect the communication of at least a portion of the subscriber contact directory to the one of a plurality of subscriber devices coupled to the selected subscriber station and to effect the display of at least a portion of the subscriber directory by the one of a plurality of subscriber devices coupled to the selected subscriber station.

5. The subscriber multi-media communication management system of claim 1, wherein the session control circuit further comprises:

means for accessing subscriber contact files stored on the one of a plurality of subscriber devices coupled to the selected subscriber station; and means for updating the subscriber contact directory to include at least a portion of the subscriber contact files.

6. The subscriber multi-media communication management system of claim 1, wherein the network communication circuit comprises:

at least one wireless transceiver for exchanging wireless signals with a compatible wireless transceiver in each subscriber station.

7. A method of operating a subscriber multi-media communication management system, the subscriber multi-media communication management system for operation with a plurality of subscriber stations, at least one of the plurality of subscriber stations being a selected subscriber station which includes a docking bay for operatively coupling a one of a plurality subscriber devices to the selected subscriber station, the method comprising the steps of:

establishing a communication session with a selected subscriber station over a network communication link;

receiving a message from the selected subscriber station indicating that the one of the plurality of subscriber devices has been operatively coupled thereto;

accessing a subscriber contact directory that is associated with the one of the plurality of subscriber devices operatively coupled to the selected subscriber station;

receiving an indication of subscriber selection of a selected contact from the subscriber contact directory; and communicating a control message to the selected subscriber station which provides for the selected subscriber station to establish an audio session channel to a packet voice gateway and for the packet voice gateway to establish an audio session channel to a destination associated with the selected contact.

8. The method of claim 7, further comprising:

communicating at least a portion of the subscriber contact directory to the selected subscriber station; and communicating control messages to the selected subscriber station to effect the display of at least a portion of the subscriber contact directory.

9. The method of claim 8, further comprising:

identifying parameters of a display associated with the selected subscriber station; and communicating display layout messages compatible with the parameters to the selected subscriber station.

10. The method of claim 7, further comprising:

communicating at least a portion of the subscriber contact directory to the selected subscriber station; and communicating control messages to the selected subscriber station to effect the communication of at least a portion of the subscriber contact directory to the one of the plurality subscriber devices coupled to the selected subscriber station and to effect the display of at least a portion of the subscriber contact directory by the one of a plurality of subscriber devices coupled to the selected subscriber station.

11. The method of claim 7, further comprising:

accessing subscriber contact files stored on the one of a plurality of subscriber devices coupled to the selected subscriber station; and updating the subscriber contact directory to include at least a portion of the subscriber contact files.

* * * * *